(12) United States Patent
Radtke (10) Patent No.: US 7,764,943 B2
(45) Date of Patent: Jul. 27, 2010

(54) OVERHEAD AND UNDERGROUND POWER LINE COMMUNICATION SYSTEM AND METHOD USING A BYPASS

(75) Inventor: William O. Radtke, Ellicott City, MD (US)

(73) Assignee: Current Technologies, LLC, Germantown, MD (US)

( * ) Notice: Subject to any disclaimer, the term of this patent is extended or adjusted under 35 U.S.C. 154(b) by 1157 days.

(21) Appl. No.: 11/389,063

(22) Filed: Mar. 27, 2006

(65) Prior Publication Data

US 2007/0223381 A1    Sep. 27, 2007

(51) Int. Cl.
*H04M 9/00* (2006.01)

(52) U.S. Cl. ............... 455/402; 455/14; 340/538

(58) Field of Classification Search .......... 455/402, 455/445; 340/538–538.17
See application file for complete search history.

(56) References Cited

U.S. PATENT DOCUMENTS

| | | |
|---|---|---|
| 2,577,731 A | 12/1951 | Berger |
| 3,656,112 A | 4/1972 | Paull |
| 3,810,096 A | 5/1974 | Kabat et al. |
| 3,911,415 A | 10/1975 | Whyte |
| 3,942,168 A | 3/1976 | Whyte |
| 3,942,170 A | 3/1976 | Whyte |
| 3,944,723 A | 3/1976 | Fong |
| 3,967,264 A | 6/1976 | Whyte et al. |
| 3,973,087 A | 8/1976 | Fong |
| 3,973,240 A | 8/1976 | Fong |
| 4,004,110 A | 1/1977 | Whyte |
| 4,012,733 A | 3/1977 | Whyte |
| 4,057,793 A | 11/1977 | Johnson et al. |
| 4,060,735 A | 11/1977 | Pascucci et al. |
| 4,250,489 A | 2/1981 | Dudash et al. |
| 4,357,598 A | 11/1982 | Melvin, Jr. |
| 4,408,186 A | 10/1983 | Howell |

(Continued)

FOREIGN PATENT DOCUMENTS

DE    197 28 270 A1    1/1999

(Continued)

OTHER PUBLICATIONS

"PLC, A New Competitor in Broadband Internet Access", *Power Line Communications Conference*, (Dec. 12, 2001),1-60.

(Continued)

*Primary Examiner*—Nick Corsaro
*Assistant Examiner*—Vladimir Magloire
(74) *Attorney, Agent, or Firm*—Mel Barnes; Capital Legal Group, LLC (57) ABSTRACT

An underground power line is coupled to an overhead power line at a riser pole. In a power line communication system, a first and a second communication device are communicatively coupled to the underground power line at different locations. A third communication device is located in the vicinity of the riser pole. The third communication device is coupled to one of either the underground power line or the overhead power line. The first communication device is configured to transmit data received from said second communication device for reception by said third communication device. The third communication device may include a backhaul link for communicating via a non-power line medium, such as to an upstream node or aggregation point coupled to an IP network.

30 Claims, 6 Drawing Sheets

U.S. PATENT DOCUMENTS

| | | |
|---|---|---|
| 4,433,284 A | 2/1984 | Perkins |
| 4,473,816 A | 9/1984 | Perkins |
| 4,473,817 A | 9/1984 | Perkins |
| 4,475,209 A | 10/1984 | Udren |
| 4,569,045 A | 2/1986 | Schieble et al. |
| 4,599,598 A | 7/1986 | Komoda et al. |
| 4,638,298 A | 1/1987 | Spiro |
| 4,642,607 A | 2/1987 | Strom et al. |
| 4,675,648 A | 6/1987 | Roth et al. |
| 4,686,382 A | 8/1987 | Shuey |
| 5,272,462 A | 12/1993 | Teyssandier et al. |
| 5,559,377 A | 9/1996 | Abraham |
| 5,625,863 A | 4/1997 | Abraham |
| 5,684,450 A | 11/1997 | Brown |
| 5,717,685 A | 2/1998 | Abraham |
| 5,726,980 A | 3/1998 | Rickard |
| 5,777,769 A | 7/1998 | Coutinho |
| 5,818,821 A | 10/1998 | Schurig |
| 5,856,776 A | 1/1999 | Armstrong et al. |
| 5,870,016 A | 2/1999 | Shresthe |
| 5,929,750 A | 7/1999 | Brown |
| 5,933,071 A | 8/1999 | Brown |
| 5,937,342 A | 8/1999 | Kline |
| 5,949,327 A | 9/1999 | Brown |
| 5,952,914 A | 9/1999 | Wynn |
| 5,978,371 A | 11/1999 | Mason, Jr. et al. |
| 5,994,998 A | 11/1999 | Fisher et al. |
| 6,014,386 A | 1/2000 | Abraham |
| 6,040,759 A | 3/2000 | Sanderson |
| 6,144,292 A | 11/2000 | Brown |
| 6,157,292 A | 12/2000 | Piercy et al. |
| 6,172,597 B1 | 1/2001 | Brown |
| 6,275,144 B1 | 8/2001 | Rumbaugh |
| 6,282,405 B1 | 8/2001 | Brown |
| 6,300,881 B1 | 10/2001 | Yee et al. |
| 6,331,814 B1 | 12/2001 | Albano |
| 6,346,875 B1 | 2/2002 | Puckette et al. |
| 6,373,377 B1 | 4/2002 | Sacca et al. |
| 6,396,392 B1 | 5/2002 | Abraham |
| 6,407,987 B1 | 6/2002 | Abraham |
| 6,452,482 B1 | 9/2002 | Cern |
| 6,522,650 B1 | 2/2003 | Yonge, III et al. |
| 6,624,532 B1 | 9/2003 | Davidow |
| 6,646,447 B2 | 11/2003 | Cern et al. |
| 6,668,058 B2 | 12/2003 | Grimes |
| 6,687,574 B2 | 2/2004 | Pietrowicz et al. |
| 6,844,809 B2 | 1/2005 | Manis et al. |
| 6,885,674 B2 | 4/2005 | Hunt et al. |
| 6,922,135 B2 | 7/2005 | Abraham |
| 6,933,835 B2 | 8/2005 | Kline |
| 6,950,567 B2 | 9/2005 | Kline |
| 6,958,680 B2 | 10/2005 | Kline |
| 6,965,302 B2 | 11/2005 | Mollenkopf et al. |
| 6,965,303 B2 | 11/2005 | Mollenkopf |
| 6,977,578 B2 | 12/2005 | Kline |
| 6,980,090 B2 | 12/2005 | Mollenkopf |
| 6,980,091 B2 | 12/2005 | White et al. |
| 6,985,714 B2 | 1/2006 | Akiyama et al. |
| 6,993,317 B2 | 1/2006 | Belsak, Jr. |
| 6,998,962 B2 | 2/2006 | Cope et al. |
| 7,042,351 B2 | 5/2006 | Kline |
| 7,046,882 B2 | 5/2006 | Kline |
| 7,075,414 B2 | 7/2006 | Paul et al. |
| 7,098,773 B2 | 8/2006 | Berkman |
| 7,103,240 B2 | 9/2006 | Kline |
| 7,142,094 B1 | 11/2006 | Davidow et al. |
| 7,173,935 B2 | 2/2007 | Lou et al. |
| 7,173,938 B1 | 2/2007 | Davidow |
| 7,194,528 B1 | 3/2007 | Davidow |
| 7,224,272 B2 | 5/2007 | White et al. |
| 7,248,158 B2 | 7/2007 | Berkman et al. |
| 7,259,657 B2 | 8/2007 | Mollenkopf et al. |
| 7,307,510 B2 | 12/2007 | Berkman et al. |
| 7,307,512 B2 | 12/2007 | Yaney et al. |
| 7,308,103 B2 | 12/2007 | Corcoran et al. |
| 7,382,232 B2 | 6/2008 | Gidge et al. |
| 2001/0054953 A1 | 12/2001 | Kline |
| 2002/0002040 A1 | 1/2002 | Kline et al. |
| 2002/0027496 A1 | 3/2002 | Cern et al. |
| 2002/0097953 A1 | 7/2002 | Kline |
| 2002/0105413 A1 | 8/2002 | Cern et al. |
| 2002/0109585 A1 | 8/2002 | Sanderson |
| 2002/0110310 A1 | 8/2002 | Kline |
| 2002/0110311 A1 | 8/2002 | Kline |
| 2002/0118101 A1 | 8/2002 | Kline |
| 2002/0121963 A1 | 9/2002 | Kline |
| 2002/0154000 A1 | 10/2002 | Kline |
| 2003/0039257 A1 | 2/2003 | Manis |
| 2003/0054793 A1 | 3/2003 | Manis et al. |
| 2003/0160684 A1 | 8/2003 | Cern |
| 2003/0169155 A1 | 9/2003 | Mollenkopf et al. |
| 2003/0218549 A1 | 11/2003 | Logvinov et al. |
| 2003/0224784 A1 | 12/2003 | Hunt et al. |
| 2003/0227373 A1 | 12/2003 | Lou et al. |
| 2004/0056734 A1 | 3/2004 | Davidow |
| 2004/0066283 A1 | 4/2004 | Manis et al. |
| 2004/0067745 A1 | 4/2004 | Belsak |
| 2004/0083066 A1 | 4/2004 | Hayes et al. |
| 2004/0090312 A1 | 5/2004 | Manis et al. |
| 2004/0110483 A1 | 6/2004 | Mollenkopf |
| 2004/0113756 A1 | 6/2004 | Mollenkopf |
| 2004/0113757 A1 | 6/2004 | White, II et al. |
| 2004/0135676 A1* | 7/2004 | Berkman et al. ........ 340/310.01 |
| 2004/0157551 A1 | 8/2004 | Gainey et al. |
| 2004/0163128 A1 | 8/2004 | Phillips et al. |
| 2004/0168199 A1 | 8/2004 | Phillips et al. |
| 2004/0223617 A1 | 11/2004 | Corcoran et al. |
| 2004/0227621 A1 | 11/2004 | Cope et al. |
| 2004/0227622 A1 | 11/2004 | Giannini et al. |
| 2004/0242185 A1 | 12/2004 | Lee |
| 2005/0033534 A1 | 2/2005 | Villicaana et al. |
| 2005/0040809 A1 | 2/2005 | Uber, III et al. |
| 2005/0046550 A1 | 3/2005 | Crenshaw et al. |
| 2005/0068223 A1 | 3/2005 | Vavik |
| 2005/0111533 A1 | 5/2005 | Berkman |
| 2005/0128057 A1 | 6/2005 | Mansfield et al. |
| 2005/0129097 A1 | 6/2005 | Strumpf et al. |
| 2005/0168326 A1* | 8/2005 | White et al. ........... 340/310.01 |
| 2005/0200459 A1 | 9/2005 | White, II |
| 2005/0220004 A1 | 10/2005 | Vollmer et al. |
| 2005/0273282 A1 | 12/2005 | Mollenkopf |
| 2005/0285720 A1 | 12/2005 | Cope et al. |
| 2006/0044076 A1 | 3/2006 | Law |
| 2006/0045105 A1 | 3/2006 | Dobosz et al. |
| 2006/0049693 A1 | 3/2006 | Abraham et al. |
| 2006/0073805 A1 | 4/2006 | Zumkeller et al. |
| 2006/0077906 A1 | 4/2006 | Maegawa et al. |
| 2006/0079198 A1 | 4/2006 | Sanderson |
| 2006/0082219 A1 | 4/2006 | Gerszberg et al. |
| 2006/0097573 A1 | 5/2006 | Gidge et al. |
| 2006/0140260 A1 | 6/2006 | Wasaki et al. |
| 2006/0146866 A1 | 7/2006 | Horvath et al. |
| 2006/0165054 A1 | 7/2006 | Iwamura |
| 2006/0192672 A1 | 8/2006 | Gidge et al. |
| 2006/0220833 A1 | 10/2006 | Berkman |
| 2006/0221995 A1 | 10/2006 | Berkman |
| 2006/0262881 A1 | 11/2006 | Cern |
| 2006/0291546 A1 | 12/2006 | Zitting |
| 2006/0291575 A1 | 12/2006 | Berkman et al. |
| 2007/0001821 A1 | 1/2007 | Berkman |
| 2007/0002771 A1 | 1/2007 | Berkman et al. |
| 2007/0002876 A1 | 1/2007 | Berkman et al. |
| 2007/0052532 A1 | 3/2007 | Berkman |
| 2007/0076505 A1 | 4/2007 | Radtke et al. |

| | | |
|---|---|---|
| 2007/0189182 A1 | 8/2007 | Berkman et al. |
| 2007/0201494 A1 | 8/2007 | Lou et al. |
| 2007/0222579 A1 | 9/2007 | Berkman |
| 2007/0223381 A1 | 9/2007 | Radtke |
| 2007/0236340 A1 | 10/2007 | White, II |
| 2007/0287406 A1 | 12/2007 | Kline |
| 2008/0012724 A1 | 1/2008 | Corcoran |
| 2008/0031367 A1 | 2/2008 | Berkman |
| 2008/0037784 A1 | 2/2008 | Corcoran et al. |

FOREIGN PATENT DOCUMENTS

| | | |
|---|---|---|
| JP | 1276933 | 11/1989 |
| WO | WO-01/08321 A1 | 2/2001 |
| WO | WO-2004/008656 A1 | 1/2004 |

OTHER PUBLICATIONS

"Power Line Communications", *Power Line Communications*, www.plexeon.com/power.html, (1998),1-2.

* cited by examiner

OVERHEAD AND UNDERGROUND POWER LINE COMMUNICATION SYSTEM AND METHOD USING A BYPASS

FIELD OF THE INVENTION

The present invention generally relates to power line communication systems, and more particularly to an underground power line communications system and method.

BACKGROUND OF THE INVENTION

The need for reliable communication networks to deliver data services such as voice over internet protocol (VoIP), video, internet web data, email, file sharing, stereo over IP, and other such services is increasing. In response to these demands, the communication infrastructure is expanding to include many types of communication networks beyond the public switched telephone network. A power line communication system is an example of a communication network in the increasing infrastructure.

Power line communication systems use portions of the power system infrastructure to create a communication network. Well-established power distribution systems exist throughout most of the United States, and other countries, for providing power to customers via power lines. With some modification, the infrastructure of the existing power distribution systems can provide data communication in addition to power delivery, thereby forming a power line communication system. Specifically, existing power lines that already have been run to and through many homes, buildings and offices, can be used to carry data signals to and from the homes, buildings, and offices. These data signals are communicated on and off the power lines at various points in the power line communication system, such as, for example, in or near homes, offices, Internet service providers, and the like.

Some commercial and residential developments are serviced by portions of the power distribution system that is underground. An underground residential distribution (URD) power line typically couples to an above overhead power lines at a riser pole. The URD power line extends underground from distribution transformer to distribution transformer, which deliver power to customer premises. Accordingly, there is a need for a reliable URD power line communication system that permits control and manage its network elements. Some embodiments of the present invention may provide these and other advantages.

SUMMARY OF THE INVENTION

The present invention provides a system for providing power line communications over a power distribution system having an underground power line. In one embodiment, a first and a second communication device are communicatively coupled to the underground power line at different locations, such as at distribution transformers. A third communication device is located in the vicinity of a riser pole and may be coupled to one of either the underground power line or the overhead power line. The first communication device, which may be located physically between the second and third devices, is configured to repeat between the first and third communication devices.

The invention will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, data and network protocols, software products and systems, enterprise applications, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description of the present invention.

System Architecture and General Design Concepts

Figure 1:
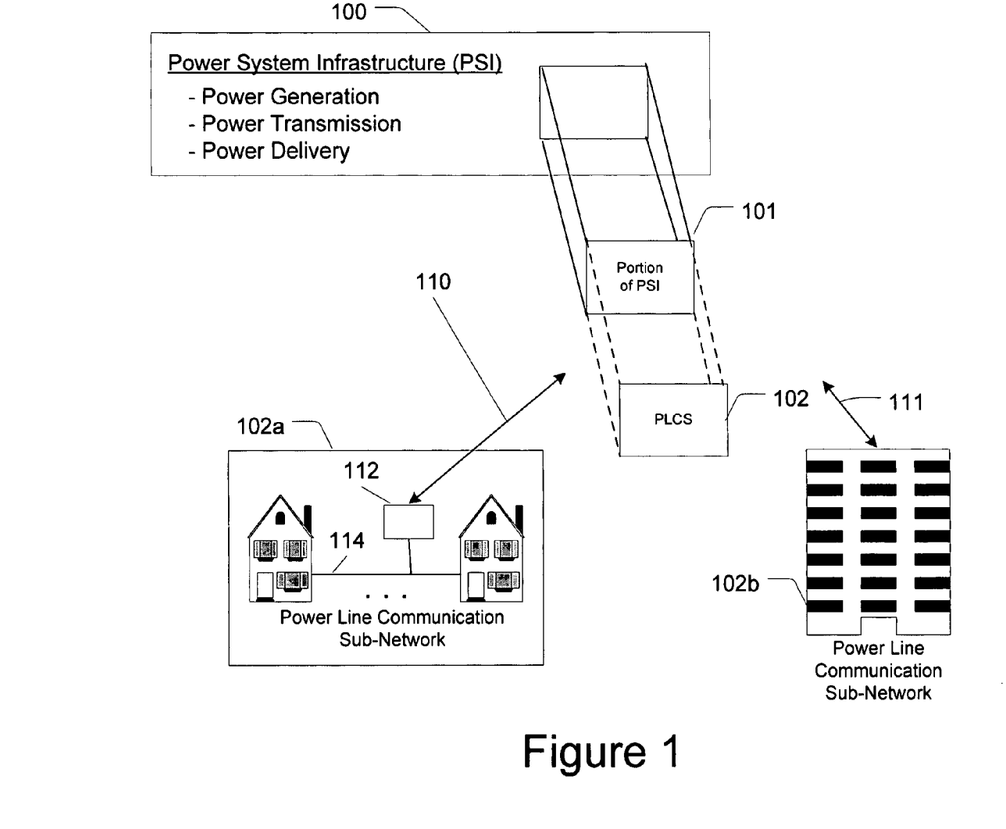
FIG. 1 is a block diagram of a power line communication system formed over a portion of a power system infrastructure.

FIG. 1 shows a power line communication system (PLCS) 102 formed using a portion 101 of the power system infrastructure 100. Any of several PLCS embodiments or the like may be implemented as a residential power line communication system 102a, a multi-unit building power line communication system 102b, or another PLCS. Some embodiments use only power lines as the communication medium. Other embodiments include some communication links using power lines and other communication links using one or more other media (e.g., wireless, fiber optic, twisted pair, coaxial cable). The term power line communication system is used herein to include a communication network having at least a power line communication medium, and that may include additional communication medium, such as a wireless, fiber optic, coaxial cable and/or twisted pair medium.

The power system infrastructure (PSI) 100, also referred to herein as a power distribution system, includes components for power generation, power transmission, and power delivery. Power is generated at a power generation source, which typically generates power as high as 25 kilo-volts (kV). A transmission substation, typically located near a corresponding power generation source, increases the generated voltage to a desired high voltage for transmission along high voltage (HV) transmission lines. Typical voltages found on HV transmission lines range from 69 kV to in excess of 800 kV.

Substations are located along the transmission lines to route high voltage power line transmissions from one portion of the power system infrastructure to another portion. Distribution substations receive the high voltage power line transmissions and reduce the high level power voltages to medium level power voltages. Medium voltage (MV) power lines 110 distribute the medium level power voltages to a region or local area. Typical voltage levels on the MV power lines 110 range from about 1000 V to about 100 kV. FIG. 1 shows MV power lines 110 extending to a residential region hosting a PLCS 102*a*. FIG. 1 also shows power lines 111 which extend to a multi-unit building hosting a PLCS 102*b*. The power lines 111 may be MV power lines in one embodiment or low voltage ('LV') power lines in another embodiment. In some embodiments the MV power lines and LV power lines extend underground.

Customer premises are served using low level voltages. To distribute power at low level voltages that are required at customer premises, the MV power lines 110 extend to multiple distribution transformers 112. A distribution transformer 112 steps down the medium level power voltages to the requisite lower level voltages. Low voltage (LV) power lines 114 carry low level power voltages to households, office, building units and other types of premises. Typical voltage levels on LV power lines 114 range from about 100 V to about 240 V.

Transformers are used to convert between the respective voltage portions, e.g., between the HV section and the MV section and between the MV section and the LV section. Transformers have a primary side for connection to a first voltage (e.g., the MV section) and a secondary side for outputting another (usually lower) voltage (e.g., the LV section). Transformers, therefore, provide voltage conversion for the power distribution system. Thus, power is carried from a substation transformer to a distribution transformer over one or more MV power lines. Power is carried from the distribution transformer to the customer premises via one or more LV power lines.

A distribution transformer 112 may function to distribute one, two, three, or more phase power signals to a structure, depending upon the demands of the user. In the United States, for example, these local distribution transformers 112 typically feed anywhere from one to ten homes, depending upon the concentration of the customer premises in a particular area. Distribution transformers may be pole-top transformers located on a utility pole, pad-mounted transformers located on the ground, or transformers located under ground level.

Power Line Communication System

Figure 2:
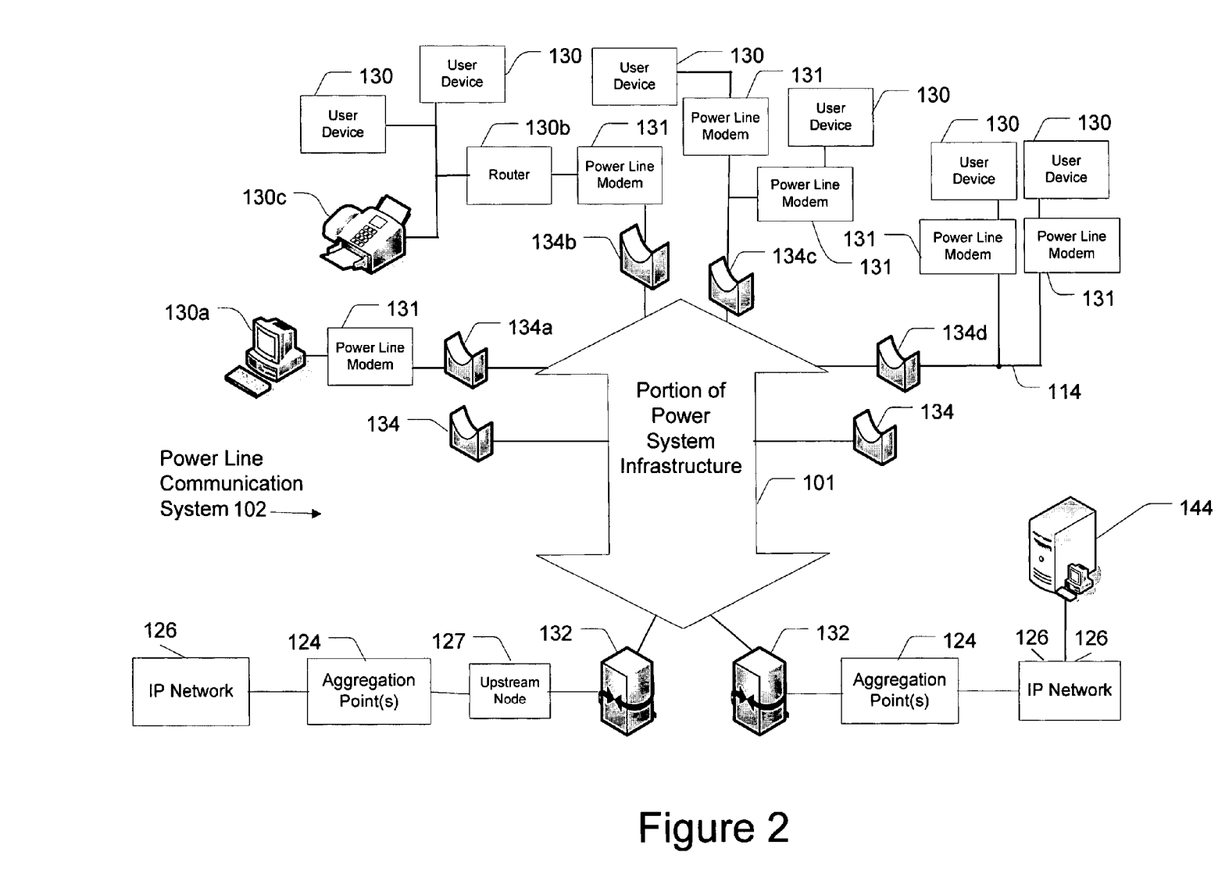
FIG. 2 is a block diagram of a power line communication system, including network elements.

FIG. 2 shows an example power line communication system which links user devices 130 to an IP network 126. The power line communication system includes a plurality of power line communication devices which couple to power lines of the power system infrastructure. In various configurations the power line communication system may include one or more power line communication networks, such as an underground power line communication network and/or an overhead power line communication network.

The power line communication system 102 may include MV power lines 110, LV power lines 114, neutral conductors (not shown) and various power line communication devices. In various embodiments the MV power lines 110 may include underground MV power lines and/or overhead MV lines. Data may be transmitted and received between power line communication devices over the power lines. In one embodiment users access the system 102 with user devices 130. Exemplary user devices 130 may include a computer 130*a*, LAN, router 130*b*, Voice-over IP endpoint or ATA, game system, digital cable box, power meter, security system, alarm system (e.g., fire, smoke, carbon dioxide, etc.), stereo system, television, fax machine 130*c*, HomePlug residential network, or other device having a digital processor and data interface. A power line modem 131 may couple the user device 130 to a power line communication network. Also, user devices 130 may be coupled to the power line modem 131 through a router, wireless transceiver (such as laptop 130*d* which is wirelessly connected to router 130*b*), or another intervening device. The power line modems 131 are coupled to an LV power line 114 in this embodiment.

Communications devices 134 may be coupled to a portion of the power distribution system infrastructure (e.g., MV power line, LV power lines, neutral power line conductors) to communicate directly or indirectly with a backhaul point 132, which typically is coupled to an aggregation point (AP) 124 directly or through one or more upstream nodes 127. The backhaul point 132 may be coupled to AP 124 (or upstream node 127) using any of several alternative communication media, such as a fiber optic, twisted pair, coaxial cable, T-carrier, Synchronous Optical Network (SONET), or another wired or wireless media. The aggregation point 124 typically includes an Internet Protocol (IP) network data packet router and is connected to an IP network backbone, thereby providing access to an IP network 126 (and be a point of presence—'POP'). Alternatively, the aggregation point 124 may be connected to a POP, which provides access to the IP network 126, or another communication network.

Figure 3:
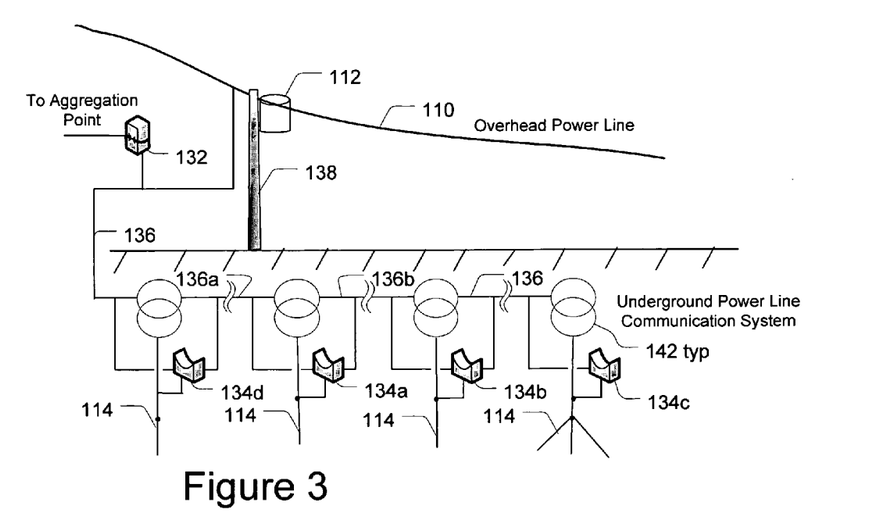
FIG. 3 is an illustration of an example embodiment of a power line communication system according to the present invention.

FIG. 3 shows an example embodiment of a power line communication system according to the present invention. In this example, power is delivered to an underground power distribution system by an underground MV power line 136, such as an underground residential distribution cable—'URD cable'). The URD cable may be coupled to an overhead power line 110 at a riser pole 138 using conventional power line coupling techniques.

The power line communication system 102 shown in FIG. 3 includes the underground power line 136 and the power line communication devices 132, 134. Data communications from an IP network may be routed through an aggregation point to the backhaul point 132. The backhaul point 132 may be communicatively coupled to the underground power line

136. In various embodiments, the backhaul point 132 also, or alternatively, may be physically coupled to the overhead power line 110.

Underground residential power systems typically include distribution transformers 142 located at intervals along the underground power line 136. In this embodiment, a bypass device 134 may be installed at each transformer 142 (e.g. within the transformer enclosure). A bypass device 134*a* may receive a data signal from a first segment of the underground MV power line 136*a* and may repeat (re-transmit) the signal onto the adjacent segment of power line 136*b* to facilitate continued propagation of the communication in the direction of the intended destination. The URD power lines are very lossy at high frequencies used to communicate broadband high speed data signals. Consequently, the repeating system of the present invention ensures reliable communications.

A bypass device 134 also may have the capability to receive and transmit power line communications over an LV power line 114 which may extend to one or more power system customer premises. For example, bypass device 134*d* may receive data from backhaul point 132 and transmit the data onto the LV power line 114. The communication protocols, prioritizing and routing functions for the power line communications are further described below in a separate section. As discussed above, one or more LV power lines may feed off of the transformer 142 thereby allowing each 134 to serve one or more customer premises. The frequencies bands used for communication over the LV power lines may be the same or different from those used on the MV power lines. In one example embodiment, communications on the MV power lines are in the 30-50 MHz band and communications on the LV power lines are in the 4-20 MHz band. In one example embodiment, the network is not a pier to pier flat network, but instead, each device may communicate with one (or more) upstream devices.

At the customer premises a power line modem 131 serves as a user device interface to the power line communication system 102. One or more power line modems 131 may be coupled to a given LV power line 114. Further, a user device 130 may be a router or other user device. Thus, a given power line modem 131 may serve one or more user devices 130, (see FIG. 2).

The power line communication system 102 may be monitored and controlled via the power line server 144, which may be remote from the structure and physical location of the PLCS 102 communication devices. In the embodiment illustrated, the power line server 144 may receive data from power line communication devices 134 through a backhaul point 132, AP 124, and an IP network 126. Similarly, the power line server 144 may send configuration and other control communications to the power line communication devices 134 through the IP network 126, backhaul point 132 and a portion 146 (e.g., power lines, intervening power line communication devices) of the PLCS 102. The monitoring and control operations of the power line server 144 are described below in more detail in a separate section.

Communication Methodology

Upstream communications originating from a user device 130 typically are implemented using a unicasting methodology. A power line modem 131 receives data from a user device 130. The power line modem may package the data and couple a data signal onto an LV power line 114 as a power line communication. Bypass device 134*a* may receive the communication from the LV power line 114, and in response may package and forward the communication onto the underground MV power line 136. The power line communication propagates along the MV power line 136. The communication may propagate in both directions, (e.g., toward bypass device 134*d* and bypass device 134*b*). Each bypass device 134*d* and 134*b* may detect a data signal presence on the MV power line 136 and evaluate the packet headers. For a communication destined for the IP network 126, the data packets may include a destination address (e.g., a MAC address) that corresponds to the backhaul point 132 (or AP). If bypass device 134*b* may detects that the destination address is that of the backhaul point 132 (or AP) and the source address is that of bypass device 134*d*, bypass device 134*a* may simply ignore the packet. Thus, bypass device 134*b* will not re-transmit the power line communication onto the underground MV power line 136. Due to signal losses along the underground power line 136, typically bypass device 134*c* would not receive the data packet, but if it did it would also ignore the data packet upon evaluation of the addresses. However, in the other direction bypass device 134*d* also may detect the data signal presence on the underground MV power line 136 and evaluate the data packet header of the communication. The bypass device 134*d* may determine that the power line communication has an upstream destination address, such as that of bypass device 132 or the AP 124. Thus, bypass device 134*d* re-transmits the power line communication onto the MV power line 136 (which would be received and ignored by bypass device 134*a*). In this manner the power line communication which may include the data originating at user device 130, or a downstream bypass device 134, eventually propagates to the backhaul point device 132, which may transmit the data packets along another medium to the AP 124 and IP network 126.

Downstream data from IP network 126 may be received at a backhaul point 132. The backhaul point 132 may receive data packets from an IP network 126, and may transmit the data packet(s) to the nearest downstream bypass device 134*d*. Each bypass device 134 receiving a data packet(s) may evaluate the packet to determine its destination address (e.g., MAC or IP address). By looking up the addresses of user devices on the bypass device 134 LV subnet, the bypass device 134 can determine if a data packet is addressed to a user device on its LV subnet. If the destination address corresponds to a user device on the bypass device's subnet, it will typically transmit the data packet onto the LV power lines for reception by the user device. Alternately, if the data packet is addressed to the bypass device 134 itself, it may process the data packet as a control command. If the data packet is not addressed to the bypass device 134 itself or to a user device on the bypass device's LV subnet and the source address is an upstream device (e.g., another bypass device 134, the backhaul point 132, the AP 124, or other device), the bypass device typically will transmit the data packet onto MV power line 136 for reception by a downstream device.

In an alternate embodiment, the bypass device also may include information in its routing table to determine that the data packet should be re-transmitted onto the MV power line and, therefore, may transmit the data packet onto MV power line 136 only if the destination and source addresses corresponds to such an address in memory. For example, each bypass device 134 may include the MAC address of the adjacent upstream and downstream bypass device. Thus, each bypass device may replace the source address of a data packet with its own MAC address to allow other bypass devices to determine whether to repeat the data.

The decision making at each bypass device 134 is referred to as a routing function, and may be performed by the router (or controller which also serves as the router). The routing function may be evaluated in part by accessing a routing table. For example, a routing table may be stored at the device's router or controller. Addresses of registered user devices and other network elements served by the bypass device 134 may be stored in the routing table. In addition, network elements of the bypass device (e.g., modems, outer, controller) may also have network addresses. In this manner the power line communication eventually propagates to the ultimate destination. The term router, route, and routing are meant to be inclusive of such functions performed by routers, bridges, switches, and other such network elements.

Communication among power line power line communication devices may occur using a variety of protocols. In one embodiment a broadband communication system is implemented in which the communication devices implement one or more layers of the 7 layer open systems interconnection (OSI) model. According to an embodiment, communications may be implemented at layer 2 (data link) and layer 3 (network) of the communication devices within a 7-layer open system interconnection model. At the layer 3 level, the devices and software implement switching and routing technologies, and create logical paths, known as virtual circuits, for transmitting data from node to node. Routing and forwarding are functions of layer 3, as well as addressing, internetworking, error handling, congestion control and packet sequencing. Layer 2 activities include encoding and decoding data packets and handling errors in the physical layer, along with flow control and frame synchronization. The data link layer is divided into two sublayers: The Media Access Control (MAC) layer and the Logical Link Control (LLC) layer. In some embodiments, a power line routing protocol is implemented at level 2 of the 7-layer OSI model.

The communication devices may perform various high level functions. One function is to perform processes responsive to PLS 144 commands. Another function is to prioritize the transmission of power line communications. Accordingly, the bypass device may prioritize transmission onto the MV or LV power lines. For example, based on the type of data, priority tagging of a data packet, or other information, a bypass device may prioritize transmission of data onto the MV power line of data received via an LV power line from a user device and data received via the MV power line from another bypass device 134. In one embodiment, a voice data and/or video data may be accorded a higher priority than other general data (e.g., web page data, email data, etc.). Note that an example bypass device may perform an operation (receive or transmit) an MV power line communication while also performing an operation (receive or transmit) for an LV power line communication.

Wireless communications, such from the backhaul point 132 to its upstream device or between a bypass device 134 and its user devices, when implemented may occur using protocols substantially conforming to the IEEE 802.16 standards, multipoint microwave distribution system (MMDS) standards, IEEE 802.11 standards, DOCSIS (Data Over Cable System Interface Specification) signal standards, or another suitable signal set. The wireless links may use any suitable frequency band. In one example, frequency bands are used that are selected from among ranges of licensed frequency bands (e.g., 6 GHz, 11 GHz, 18 GHz, 23 GHz, 24 GHz, 28 GHz, or 38 GHz band) and unlicensed frequency bands (e.g., 900 MHz, 2.4 GHz, 5.8 Ghz, 24 GHz, 38 GHz, or 60 GHz (i.e., 57-64 GHz)). In another example, frequencies are selected from among other frequency bands including a 75 GHz frequency and a 90 GHz frequency. In still another example, it may desirable to use frequencies that are greater than 2 GHZ, more preferably greater than 5 GHz, still more preferably greater than 22 GHz, and even more preferably greater than 57 GHz.

Figure 4:
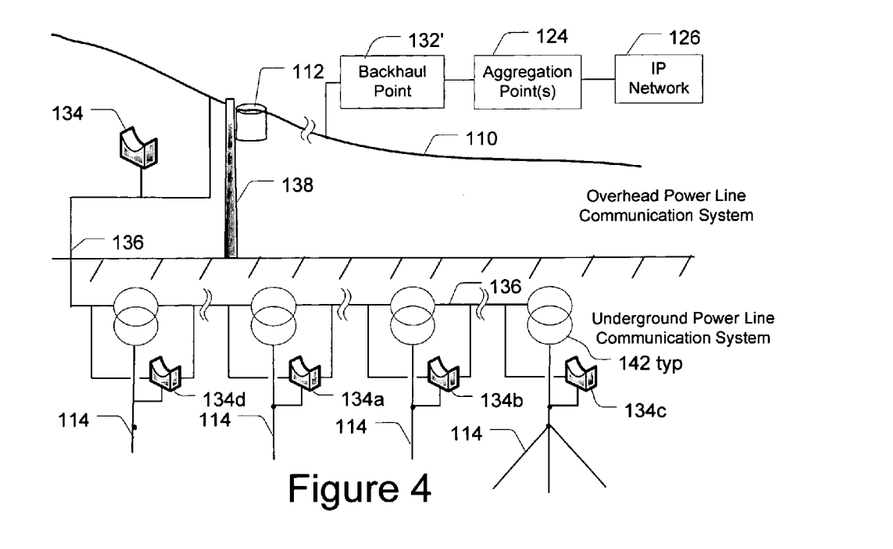
FIG. 4 is an illustration of an example embodiment of a power line communication system according to the present invention.

In some these embodiments power line communications may propagate between the underground power line 136 and overhead power line 110 unless isolation of data signals is provided. Such propagation may be desired or undesired depending on the embodiment. FIG. 4 shows an embodiment in which the backhaul point 132 is coupled to an overhead MV power line 110 away from the riser pole 139. In such an embodiment a bypass device 134 may be coupled to the underground power line the riser pole and repeat the power line communication, so as to propagate the communication onto the overhead power line 110. One skilled in the art will appreciate that the underground power line 136 may extend above ground at the riser pole 139 to couple with the overhead power line 110. The backhaul point 132 (see FIG. 3) or bypass device 134 (see FIG. 4) may couple to the underground power line 136 at a location above ground or underground in the vicinity of the riser pole 139. The backhaul point 132 coupled to the overhead power line 110 may also provide communications to one or more bypass devices 134 that are coupled to the overhead MV power line 110 or other overhead medium.

Thus, in such a configuration the underground and overhead networks may implement compatible communication protocols and be communicatively coupled. In such configurations the underground and overhead networks may share a backhaul 132 (see FIG. 4) for communications with an IP network 126. In other configurations the underground power line network implements a different communication protocol than the overhead power line communication network. In such incompatible configuration, the underground power line communication signals are generally filtered and/or isolated from the overhead power line communication signals, so that interference between the two types of communication signals is minimized or avoided. For example, a directional coupling or data filter may be used to isolate the two networks. A detailed description of power line communication coupler that includes an data signal attenuator and a directional coupler is provided in U.S. patent application Ser. No. 11/265,230 filed Nov. 3, 2005, entitled "Power Line Power Line Coupling Device and Method of Using the Same," which is hereby incorporated by reference in its entirety.

Power Line Communication Devices

Exemplary power line communication devices include a backhaul point 132, and a bypass device 134.

Figure 5:
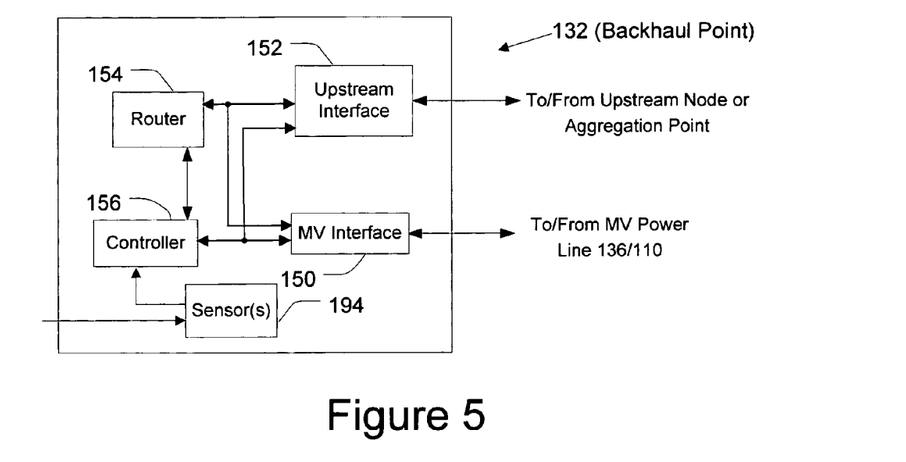
FIG. 5 is a block diagram of an embodiment of a backhaul point.

Backhaul Point 132:

FIG. 5 shows a backhaul point 132. A backhaul point 132 is a communication device to which many other power line communication devices may route data to be forwarded out of the power line communication system 102. The backhaul point 132 may route the data directly to an aggregation point 124 or to an upstream node(s) 127, which in turn may route the data to an aggregation point 124 (see FIG. 2). A backhaul point 132 may be coupled to an MV power line and to a backhaul link (e.g., fiber optic, twisted pair, coaxial cable, wireless medium) serving to link to an upstream node 127 or aggregation point 124.

Figure 6:
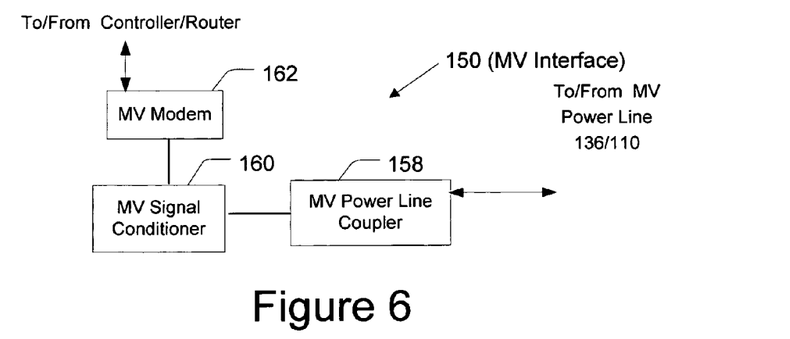
FIG. 6 is a block diagram of an embodiment of an MV interface for an example the backhaul point.

The backhaul point 132 may include an MV interface 150, an upstream interface 152, a router 154 and a controller 156. In some embodiments the router may form part of the controller 156. Referring to FIG. 6, the MV interface 150 may include a MV power line coupler 158, a MV signal conditioner 160 and a MV modem 162. The MV power line coupler 158 couples data to/from the MV power line and prevents the medium voltage power from passing from the MV power line 110/136 to the rest of the backhaul point's circuits, while allowing the communications signal to pass to/from the backhaul point 132 from/to the MV power line 110/136. The MV signal conditioner 160 may include a filter (for filtering for frequency band(s) of interest), amplifier and other circuits which providing transient voltage protection. Data signals from the MV signal conditioner 160 are supplied to the MV modem 162, which demodulates/modulates the signals.

In various embodiments the upstream interface 152 may include a fiber optic modem, wireless modem, or another suitable transceiver for communication over a medium that couples the backhaul point with 132 an upstream node 127 or aggregation point 124.

The backhaul point router 154 routes data along an appropriate path. The router 154 may receive and send data packets, match data packets with specific messages and destinations, perform traffic control functions, performs usage tracking functions, authorizing functions, throughput control functions and similar routing-relating services. The router 154 may route data from the MV interface 150 to the upstream interface 152 and from the upstream interface 152 to the MV interface 150. Thus, the router 154 may serve to route data (i) from the MV power lines to an upstream node 127 or aggregation point 124, and (ii) from the upstream node 127 or aggregation point 124 to the MV power lines 136/110.

The backhaul point 132 may also include a processor or other controller 156 which controls operations of the backhaul point 132, such as the receiving software downloads, responding to commands from the PLS, etc. Additional description of the controller 156 is described below in a separate section.

The backhaul point 132 also may have a debug port to connect serially to a portable computer. The debug port preferably connects to any computer that provides terminal emulation to print debug information at different verbosity levels and can be used to control the power line communication device in many respects such as sending commands to extract all statistical, fault, and trend data. Further, in some embodiments one or more sensors 194 are included at or in the vicinity of a backhaul point 132. The sensors are described in more detail below in a separate section. In another embodiment, the backhaul point 132 may include a low voltage interface to service user devices (discussed below)

Figure 7:
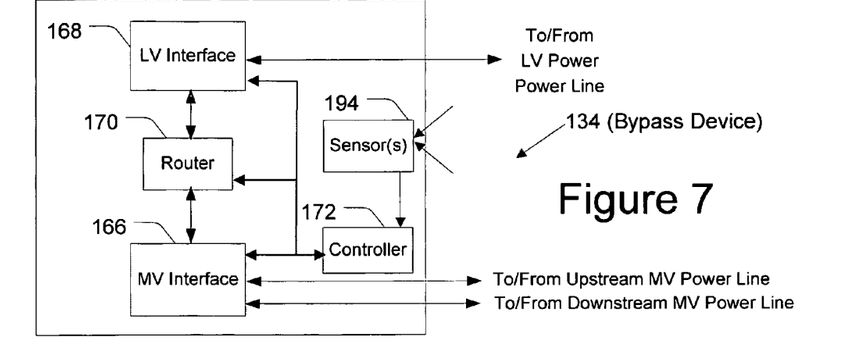
FIG. 7 is a block diagram of an example embodiment of a bypass device.
Figure 8:
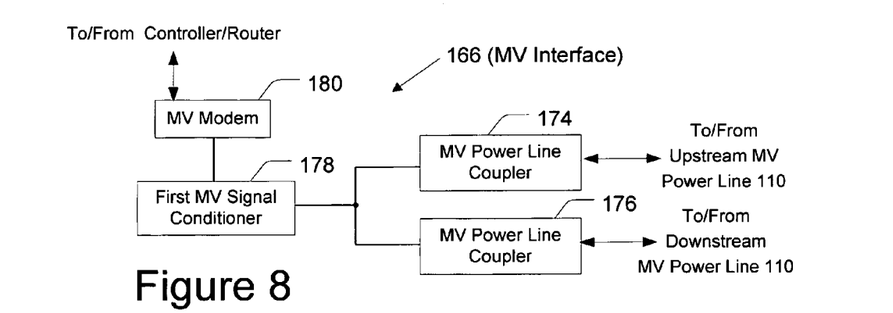
FIG. 8 is a block diagram of an embodiment of a MV interface for a bypass device.

Bypass Device 134:

FIG. 7 depicts an example embodiment of a bypass device 134 for communicating with an underground power line 136. The bypass device 134 may include an MV interface 166, an LV interface 168, a router 170 and a controller 172. FIG. 8 the MV interface 166, which may be used to couple to the two MV power lines 136—one power line 136a at an upstream side of a transformer 142 and the other 136b on a downstream side of the transformer 142 (see FIG. 3). The MV interface 166 may include an MV power line coupler 174 that couples to the upstream side of the transformer 142, another MV power line coupler 176 that couples to the downstream side of the transformer 142, an MV signal conditioner 178 and an MV modem 180. These components function substantially the same way as the similar named components of MV interface of the backhaul point 132 and therefore their description is not repeated here. In an alternate embodiment, only one MV power line coupler is used (e.g., on the upstream side of the transformer) and the data signals may be repeated via that coupler or, alternately, may not be repeated and simply allowed to propagate further downstream for reception by other bypass devices 134.

Figure 9:
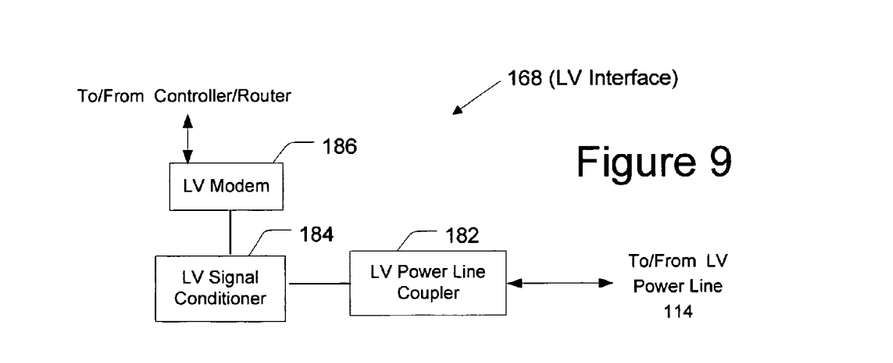
FIG. 9 is a block diagram of an embodiment of an LV interface an the bypass device.

FIG. 9 depicts an LV interface 168, which may couple to the LV power line 114. The LV interface 168 may include an LV power line coupler 182, an LV signal conditioner 184 and an LV modem 186. In one embodiment the LV power line coupler 182 may be an inductive coupler and, in yet another embodiment, may be a capacitive coupler. In another embodiment the LV power line coupler 182 may be a galvanic coupler (e.g., mechanical clamp). The LV signal conditioner 184 may provide a filter (for filtering for the band of interest), amplifier, and other circuits which providing transient voltage protection Data signals from the LV signal conditioner 184 are supplied to the LV modem 186, which demodulates/modulates the signals.

The bypass device 134 may also include a router 170 and controller 172. The router 170 may receive and transmit data packets, match data packets with specific messages and destinations, perform traffic control functions, and perform usage tracking functions, authorizing functions, throughput control functions and similar routing-relating services. The router 170 may route data from the LV interface 168 to the MV interface 166, from the MV interface 166 to the LV interface 168, and from the MV interface 166 back through the MV interface 166. Thus, the router 170 may route data (i) from the MV power lines 136 to the LV power lines 114 to a customer's premises, and (ii) from the LV power lines 114 to the MV power line 136. The router may also repeat data signals received from the MV power line 136 back onto the MV power line 136 so as to further propagate the data signal along the URD cable.

In some embodiments user devices and varying types of data packets are assigned a priority level. In such embodiments the bypass device 134 may assess the priority of a power line communication to be transmitted onto the LV power line 114 or received from the LV power line 114. For example, it is beneficial to allow a higher priority for voice over internet (voice data) data packets, than for simple textual e-mail transmission data packets. Priority levels may be assigned by the network element manager, power line server 144 or local controller 156/172, bypass device 134, and may be enforced at the controller 156/172 (or router).

Figure 10:
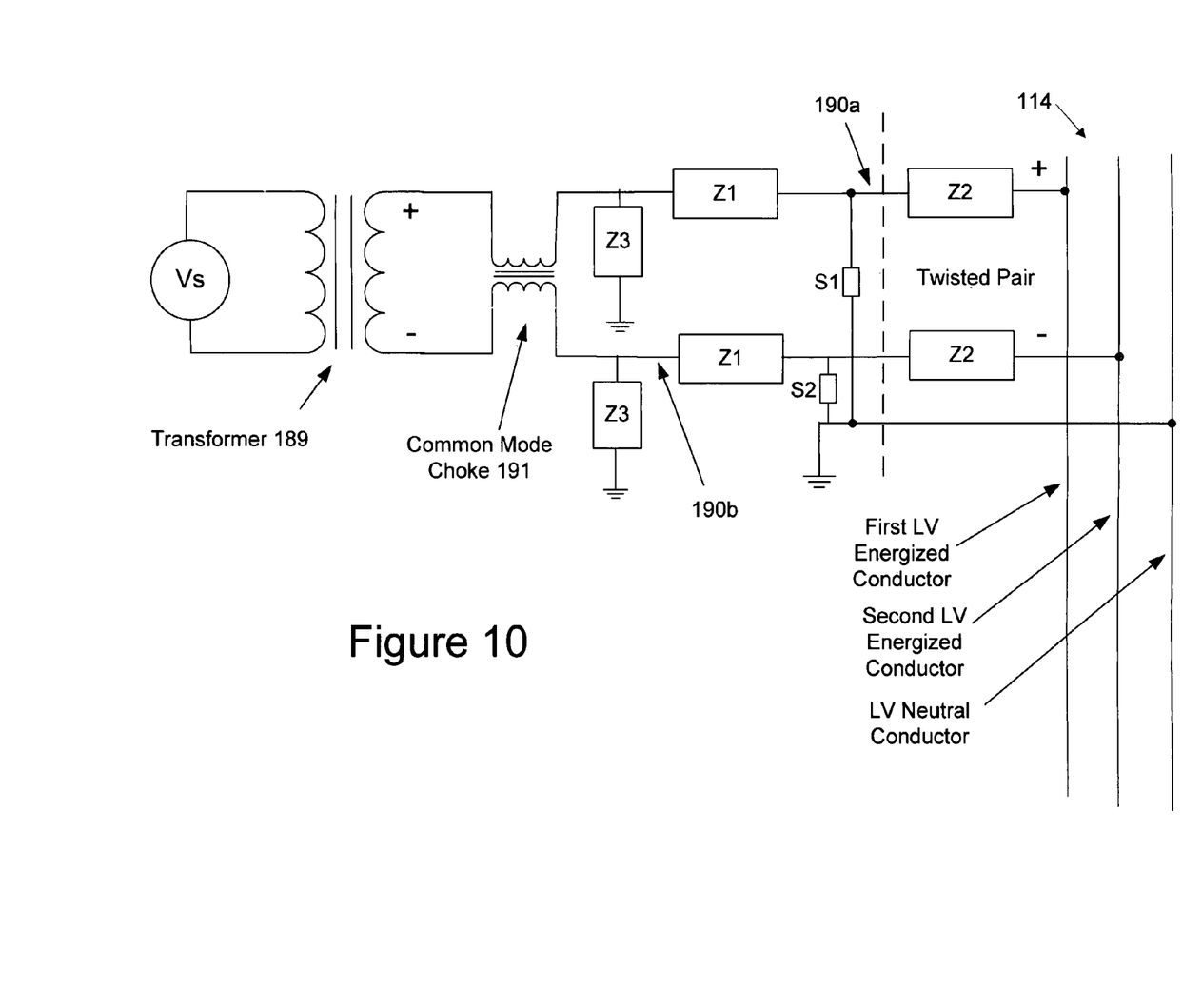
FIG. 10 is a schematic diagram of an embodiment of a transmit and receive circuit for a bypass device.

FIG. 10 depicts an example embodiment of a transmit and receive circuit for an LV power line coupler 182. Components to the left of the dashed line in FIG. 11 may be inside am enclosure of the bypass device 134 and those to the right may be outside the enclosure. The circuit of this embodiment may comprise a transformer 189 that drives one conductor pair 190, which traverse through a common mode choke 191. The common mode choke 191 may provide a very low impedance to differential currents in the two conductors 190a,b, but provides a significant or high impedance to common mode currents (i.e., currents traveling in the same direction such as in or out). The two conductors 190a,b may also be coupled to ground by an impedance Z3, which may be a resistive impedance. In addition, each conductor 190a, b may include a series impedance Z1, which may be a capacitive impedance, or other low pass filter component(s), for impeding the 60 Hz power signal and permitting the RF data signal to pass unimpeded. Such impedances may be on either side of the common mode choke, but are preferably on the LV power line side of the choke.

In either embodiment, each conductor 190a,b may also include a surge protection circuit, which in FIG. 10 are shown as S1 and S2. The conductors may form a twisted pair of conductors between the bypass device enclosure and LV power line 114. As will be evident to those skilled in the art, the twisted pair cable may have an impedance (determined by the geometry of the cable) as represented by Z2. This impedance Z2 may be modeled by a resistive component and an inductive component. The inductive component also may cause coupling between the two twisted wired conductors.

While not shown in the figures, the transmit circuit of either embodiment may also include a fuse in series with each conductor and a voltage limiting device, such as a pair of oppositely disposed zener diodes (or other transient voltage suppressor circuit), coupled between the pair of conductors and may be located between the common mode choke and the transformer. Finally, one of the conductors of the bypass device cable(s) 190 may used to supply power to the power supply of the bypass device 134 to power the bypass device 134.

It is worth noting that these embodiments of the present invention drive the first and second LV energized conductors differentially to transmit the data signal (e.g., using OFDM). However, the power line modems 131 transmit data signals from the customer premises to the bypass device 134 by applying the data signal to one conductor (e.g., one energized conductor) referenced to the other conductor such as a ground and/or neutral. Note that the voltage source Vs represents the modulated data signal from the LV modem 186 that has been amplified and filtered by the LV signal conditioner 184.

While in this embodiment the two energized conductors are opposite in magnitude, other embodiments may phase shift the data signal on one conductor (relative to the data signal on the other conductor) by forty-five degrees, ninety degrees, one hundred twenty degrees, one hundred eighty degrees, or some other value, in addition to or instead of differentially driving the two conductors.

Various embodiments of bypass devices 134 may provide various communication services for user devices 130 such as for example: security management; IP network protocol (IP) packet routing; data filtering; access control; service level monitoring; service level management; signal processing; and modulation/demodulation of signals transmitted over the communication medium.

Further, in some embodiments one or more sensors 194 are included at or in the vicinity of a bypass device 134. The sensors 194 are described in more detail below in a separate section.

Controller 156/170:

As described above, the power line communication devices, such as a backhaul point 132 or bypass device 134, may include a controller 156/172. The controllers 156, 172 include hardware and software for managing communications and control of the power line communication device 132, 134 at which the controller is located. In one embodiment, the controller 156/172 may include an IDT 32334 RISC microprocessor for running embedded application software, along with flash memory for storing boot code, device data, configuration information (serial number, MAC addresses, subnet mask, and other information), application software, routing table(s), and statistical and measured data. In some embodiments the memory may also store the program code for operating the processor to perform the routing functions in place of a router.

The controller 156/172 also may include random access memory (RAM) for running the application software and for providing temporary storage of data and data packets. The controller 156/172 may also include an Analog-to-Digital Converter (ADC) for taking various measurements, which may include: (i) measuring the temperature inside a bypass device 134 enclosure or other device enclosure (through a temperature sensor such as a varistor or thermistor), (ii) taking power quality measurements, (iii) detecting power outages and power restoration, (iv) measuring the outputs of feedback devices, and (v) other measurements. The controller 156/172 may also include a "watchdog" timer for resetting the communication device should a hardware glitch or software problem prevent proper operation to continue.

In addition to storing a real-time operating system, the memory of controller 156/172 also may include various program code sections such as a software upgrade handler, software upgrade processing software, power line server ('PLS') command processing software (which receives commands from the PLS 144, and processes the commands, and may return a status back to the PLS 144), ADC control software, power quality monitoring software, error detection and alarm processing software, data filtering software, traffic monitoring software, network element provisioning software, and a dynamic host configuration protocol (DHCP) Server for auto-provisioning user devices (e.g., user computers) and associated power line communication devices.

The backhaul point 132 controller 156 may also include an Ethernet adapter with an optional on-board MAC and physical (PHY) layer Ethernet chipset that can be used for converting peripheral component interconnect (PCI) to Ethernet signals for communicating with an upstream interface 152 (see FIG. 6). For example, an RJ45 connector may provide a port for a wireless transceiver for communicating wirelessly.

Sensors 194:

The power line communication devices (e.g., backhaul point 132, bypass devices 134, and/or power line modems 131) also may include one or more sensors 194 for collecting data, which may be processed, stored and/or transmitted to the power line server 144 or other computer for processing and/or storage. For example, the backhaul point 132 and bypass devices 134 may include a level sensor incorporated inside its housing (or attached to a transformer pad, utility pole or underground mount) that senses whether the sensor is level with ground (i.e., perpendicular to the pull of gravity). When the level sensor is installed so that it is level to the ground, the power line communication device, via the level sensor, can sense when (or if) the pad, pole or other structure to which the device is mounted becomes tilted relative to the ground. The power line communication device may periodically detect or poll the level sensor. Upon detection of a tilt via the level sensor, the device may transit an alarm to the power line server 144, which may automatically and electronically transmit a notification to the computer system of a power utility supplier in order to dispatch a repair or inspection crew.

Another type of sensor 194 which may be included is a current sensor. One or more electric current sensors may be included, such as a magnetically permeable toroid with windings. For example, at a bypass device 134, the current sensor may be coupled around a separate LV energized conductor connected to a customer premises. The winding may be connected to a resistor (which also is connected to ground) that is also connected an analog to digital converter ('ADC'), whose voltage may be periodically read by the processor. The current flowing to each customer premises (in each LV energized conductor) may be periodically measured. Such measured current may be processed, stored, and transmitted to the power line server 144 (which may further process, store, and/or transmit the data). Because the bypass device 134 may also measure the voltage supplied to the customer premises, the bypass device 134 may be used to measure the power consumption of each customer premises. The real-time power consumption data may be stored in memory of the power line server 144 or another computer and be supplied to the user upon transmitting a request for power usage data, which may be supplied to the user along with the real-time consumption cost to the user (i.e., the user's utility bill to date) via the power line communication system 102. The data may also be processed by the bypass device 134 or power line server 144 to provide customer load characteristics and patterns.

Other sensors 194 that may be connected to a power line communication device may include a camera (e.g., for monitoring security, detecting motion, confirming a truck roll, vegetation management, or monitoring automobile traffic flow), an audio input device (e.g., microphone for detecting noise, noise patterns, or particular sounds—any of which may be a precede and therefore predict an insulator or other EPDN component failure), a vibration sensor, a motion sensor (e.g., an infrared motion sensor), a wind speed and direction sensor, a thermometer (for measuring ambient temperature or measuring the temperature of the transformer casing, which may be value in predicting a transformer failure), a barometer, and/or a sensor(s) which detects toxic fumes or other toxic agents (e.g., to detect biohazards). The cameras also may be used to monitor electrical power distribution network infrastructure, such as substations, or to view power usage meters therein or elsewhere. The camera may be remotely controlled to allow zooming in, zooming out, panning left, right, up, or down. The video data or other sensed data may be transmitted via the power line communication system 102 to a remote computer for processing or may be processed by a bypass device 134 or backhaul point 132. If a bypass device 134, backhaul point 132 or remote computer makes a detection (e.g., detects noise or a particular sound, detects motion, detects a qualified vibration, detects a pole tilt, etc.), an automated notification may be transmitted to the utility company or a user as the case may be. Such notification may also traverse the power line communication system 102. In some embodiments the power line communication device may also include an audio output device to serve as a public address system. Thus, a user may provide a voice input at the PLS or other remote computer. The voice data may then be transmitted in unicast or multicast fashion to one or more backhaul points and/or bypass devices, which may receive the data, convert the data to voice data and provide the signal to the audio output device for broadcast to alert citizens in a city, town, suburb, block, building, or other area.

Other sensors 194 located at a backhaul point 132, bypass device 134 may include water/moisture sensors, temperature sensors, and/or light sensors. For example, bypass devices 134 located at an underground transformer or pad transformer and coupled to an underground MV power line 136 may include a sensor to detect moisture levels or water depth within the enclosure (or bypass device). The sensed levels may be received and are monitored by the PLS 144 to determine when servicing is needed. A light sensor, such as a photo-detector) also may be included to detect when someone has opened a transformer enclosure or whether damage has occurred to the site enclosure.

With regard to a power line modem 131, still other sensors 194 may be connected to or integrated with the power line modem inside the customer premises. Examples of sensors that may be included at the power line modem 131, include (but are not limited to) a camera (e.g., for monitoring security, detecting motion, monitoring children's areas, monitoring a pet area), an audio input device (e.g., microphone for monitoring children, detecting noises), a vibration sensor, a motion sensor (e.g., an infrared motion sensor for security), a home security system, a smoke detector, a heat detector, a carbon monoxide detector, a radon detector, a natural gas detector, a thermometer, and a barometer. The sensed data may be received and monitored by a bypass device 134, power line server 144 or other remote computer. Communications, such as an email notification, then may be sent back to the customer premises to a user device 130 via the power line communication system 102 and IP network 126. The video data, audio or other sensed data may be transmitted via the power line communication system 102 to a remote computer for processing and/or presentation (audibly, visually, textually, and/or graphically) to the user via the internet on a presentation device such as a computer, mobile telephone, personal digital assistant (PDA), or other device. In addition, the power line modem may be connected to, or integrated with, control devices to allow the user to similarly remotely monitor (e.g., to receive settings and/or status such as on or off) and control (e.g., to turn on, turn off, and/or change settings) various home appliances and systems via any of the same user devices. For example, the power line modem 131 may be connected to, or integrated into, a thermostat (to control heat and air conditioning and/or temperature setting), humidifier, air filtering mechanism, home computer, personal video recorder (e.g., to remotely set or start recording), tuner, digital cable set top box, video cassette recorder, stereo, oven, audio input device, video camera(s), refrigerator, dishwasher, hot water heater, fan, light, lighting system (e.g., to turn on or off select lights), copier, printer, answering machine, router, sprinkler system (e.g., to turn on or off select sprinklers), whirlpool (e.g., to remotely fill and/or heat), pool (e.g., to control heating, lighting, and/or filtering), motion sensor, home security system, smoke detector, natural gas detector, carbon monoxide detector, and heat detector. Likewise, detections by these sensors (e.g., a smoke detector detecting smoke) may cause a notification to be sent to the user device via the power line communication system 102.

Power Line Server Command Processing Software

In some embodiments a power line server may function as a network element manager for the communication devices in the PLCS 102. The power line server ('PLS') 144 and the power line communication devices may communicate with each other through two types of communications: 1) PLS Commands and power line communication device responses, and 2) power line communication device Alerts and Alarms. In one embodiment, TCP packets are used to communicate commands and responses. Responses sent by the power line communication device may be in the form of an acknowledgement (ACK) or negative acknowledgement (NACK), or a data response depending on the type of command received by the power line communication device.

Commands:

The PLS 144 may transmit any number of commands to a power line communication device to support system control of power line communication device functionality. As will be evident to those skilled in the art, most of these commands are equally applicable for bypass devices 134 and repeaters. For ease of discussion, however, the description of the commands and other software features will be in the context of a bypass device 134 only. The PLS commands may include altering configuration information, synchronizing the time of the bypass device 134 with that of the PLS 144, controlling measurement intervals (e.g., voltage measurements of the analog-to-digital converter), requesting measurement or data statistics, requesting the status of user device activations, and requesting reset or other system-level commands. Any or all of these commands may require a unique response from the bypass device 134, which is transmitted by the bypass device 134 and received and stored by the PLS 144.

Alerts:

In addition to commands and responses, the power line communication devices have the ability to send Alerts and Alarms to the PLS 144 or other network element manager (NEM) via User Datagram Protocol (UDP), which does not require an established connection (but also does not guarantee message delivery).

Alerts typically are either warnings or informational messages transmitted to the NEM in light of events detected or measured by the power line communication device. Alarms typically are error conditions detected by the power line communication device. Due to the fact that UDP messages may not be guaranteed to be delivered to the NEM, the power line communication device may repeat Alarms and/or Alerts that are critically important to the operation of the device.

One example of an Alarm is an Out-of-Limit Alarm that indicates that an out-of-limit condition and has been detected at the bypass device 134, which may indicate a power outage on the LV power line, a temperature measurement inside the bypass device 134 is too high, and/or other out-of-limit condition. Information of the Out-of-Limit condition, such as the type of condition (e.g., a LV voltage measurement, a BD temperature), the Out-of-Limit threshold exceeded, the time of detection, the amount (e.g., over, under, etc.) the out of limit threshold has been exceeded, is stored in the memory of the bypass device 134 and may be retrieved by the NEM or PLS 144.

Software Upgrade Handler:

The Software Upgrade Handler software may be started by the PLS Command Processing software in response to a PLS command. Information needed to download the upgrade, including for example the remote file name and PLS IP address, may be included in the parameters passed to this software module (or task) from the Software Command Handler.

Upon startup, this task may open a file transfer program such as Trivial File Transfer Protocol (TFTP) to provide a connection to the PLS and request the file. The requested file is then downloaded to the power line control device. For example, the PLS 144 may transmit the upgrade through the IP network 126, through the backhaul point 132, through the MV power line 136 to the bypass device 134 where the upgrade may be stored in a local RAM buffer and validated (e.g., error checked) while the bypass device 134 continues to operate (i.e., continues to communicate packets, such as to and from power line modems and to and from the backhaul point 132). Finally, the task copies the downloaded software into a backup boot page, and transmits an Alert indicating successful installation to the PLS 144. A separate command transmitted from the PLS 144, processed by the Command Processing software of the power line communication device, may make the newly downloaded and validated program code the primary software operating the power line communication device. If an error occurs, the power line communication device issues an Alert indicating the download was not successful.

ADC Scheduler:

The analog-to-digital 'ADC' Scheduler software, in conjunction with the real-time operating system, creates ADC scheduler tasks to perform ADC sampling according to configurable periods for each sample type. Each sample type corresponds with an ADC channel. The ADC Scheduler software creates a scheduling table in memory with entries for each sampling channel according to default configurations or commands received from the PLS 144. The table contains timer intervals for the next sample for each ADC channel, which are monitored by the ADC scheduler.

ADC Measurement Software:

The ADC Measurement Software, in conjunction with the real-time operating system, creates ADC measurement tasks that are responsible for monitoring and measuring data accessible through the ADC. Each separate measurable parameter may have an ADC measurement task. Each ADC measurement task may have configurable rates for processing, recording, and reporting for example.

An ADC measurement task may wait on a timer (set by the ADC scheduler). When the timer expires the task may retrieve all new ADC samples for that measurement type from the sample buffer, which may be one or more samples. The raw samples are converted into a measurement value. The measurement is given the timestamp of the last ADC sample used to make the measurement. The measurement may require further processing. If the measurement (or processed measurement) exceeds limit values, an alarm condition may be generated. Out of limit Alarms may be transmitted to the PLS 144 and repeated at the report rate until the measurement is back within limits. An out of limit recovery Alert may be generated (and transmitted to the PLS 144) when the out of limit condition is cleared (i.e., the measured value falls back within limit conditions).

The measurements performed by the analog-to-digital converter, each of which has a corresponding ADC measurement task, may include bypass device inside temperature, MV current sensing, MV power line voltage, LV power line voltage, and LV power line current (e.g., the voltage across a resistor).

The power line communication devices include value limits for most of these measurements stored in memory with which the measured value may be compared. If a measurement is below a lower limit above an upper limit or otherwise out of an acceptable range, the power line communication device may transmit an Out-of-Limit Alarm, which is received and stored by the PLS 144. In some instances, one or more measured values are processed to convert the measured value(s) to a standard or more conventional data value.

The measured data (or measured and processed data) is stored in the memory of the power line communication device. This memory area contains a circular buffer for each ADC measurement and time stamp. The buffers may be read by the PLS Command Processing software task in response to a request for a measurement report. The measurement data may be backed up to flash memory by the flash store task.

The LV power line voltage measurement may be used to provide various information. For example, the measurement may be used to determine a power outage, or measure the power used by a consumer or by all of the consumers connected to that distribution transformer. In addition, it may be used to determine the power quality of the LV power line by measuring and processing the measured values over time to provide frequency, harmonic content, and other power line quality characteristics.

Traffic Monitoring Software:

The Traffic Monitoring software may collect various data packet traffic statistics, which may be stored in memory including the amount of data (i.e., packets and/or bytes) communicated (i.e., transmitted and received) through the MV power line, and/or through the LV power line; the amount of data (packets and/or bytes) communicated (transmitted and received) to and/or from the PLS 144; the number of Alerts and Alarms sent to the PLS 144; the number of DHCP requests from user devices; the number of failed user device authentications; the number of failed PLS authentications; and the number of packets and bytes received and/or transmitted from/to each user device 130 or power line modem 131.

Data Filtering Software:

The Data Filtering software provides filtering of data packets transmitted to and/or from a user device 130 (or power line modem 131). The filtering criteria may be supplied from the PLS 144 (which may be based on requests received from the user) and is stored in memory of a bypass device 134 and may form part of the routing table. The Data Filtering software may analyze the data packets and may prevent the transmission of data packets through the bypass device 134: 1) that are transmitted to the user device 130 from a particular source (e.g., from a particular person, user, domain name, email address, or IP or MAC source address); 2) that are transmitted from the user device 130 to a particular destination (e.g., to a particular person, email address, user, domain name, or IP or MAC destination address); 3) that have particular content (e.g., voice data or video data); 4) based on the time of transmission or reception (e.g., times of the day and/or days of the week); 5) that surpass a threshold quantity of data (either transmitted, received, or combination thereof for a predetermined window of time (e.g., a day, week, month, year, or subscription period); or 6) some combination thereof.

Auto-Provision and Activation of Network Components:

"Auto-Provisioning" is the term used that may be used to refer to the steps performed to get a new network element (e.g., a bypass device 134, or backhaul point 132) onto the PLCS 102 network. While skilled in working with power lines, personnel installing the power line communication devices (linemen) often have little or no experience in working with communication networks. Consequently, it is desirable to have a system that permits easy installation of the power line communication devices without the need to perform network configuration or other network installation procedures.

In the present example embodiment, each network element includes a unique identifier, which may be a serial number. In one embodiment, the enclosure of the bypass device 134 or other device has a barcode that the installer scans to record the serial number. The installer also records the location of the installed device. This information (the identifying information and location) is provided to a network administrator to input the information into the PLS 144. Alternately, the installer may wirelessly transmit the information to the PLS 144 for reception and storage by the PLS 144.

In one example embodiment, after being physically installed and powered up, the bypass device 134 transmits a request, such as a dynamic host configuration protocol (DHCP) request, to the backhaul point 132 with whom the communication device is physically or functionally connected. In response to the request, the backhaul point 132 assigns and transmits an IP address to the MV interface 166 (i.e., assigns an IP address to be used to communicate with the MV modem 180), and the MV subnet mask. In addition, the backhaul point 132 transmits the IP address of the backhaul point 132 to be used as the bypass device's or repeater's network gateway address, and the IP address for the PLS 144. The bypass device 134 receives the information from the backhaul point 132 and stores it in its non-volatile memory.

The bypass device 134 then transmits an Alive Alert to the PLS (using the IP address received in response to the DHCP request) indicating that the device 134 is running and connected to the network. The Alive Alert may include information identifying the bypass device or repeater, the network configurations of such device 134 (e.g., MAC addresses of the LV modem 186 and MV modem 180), the IP address of the MV Interface (i.e., the IP address assigned to the MV modem 180 received from the backhaul point 132) and MV subnet mask for use by the communication device's backhaul interface (much of which was received from the backhaul point 132). This information is stored by the PLS 144 in the network elements database.

In response, the PLS 144 may activate the bypass device 134 by assigning and transmitting to the bypass device 134 a LV subnet mask and a LV Interface IP address (i.e., the IP address used to communicate with the LV modem 186). If there are customers present on the LV subnet, the PLS 144 will transmit customer information to the bypass device 134, which may include such information as data filtering information, keys (e.g., encryption keys), user device IP addresses, and subscription levels for the various users and/or user devices. In addition, the PLS 144 may configure the bypass device 134 by transmitting DNS addresses (e.g., a first and second DNS address), and a registration server IP address. This information is stored by the PLS 144 (in the network elements database) and the bypass device 134. As discussed below, until a user device is registered, the bypass device 134 may be programmed to allow the user device 130 to access only the domain name servers and registration server.

Provisioning a New User Device:

Similarly, when a user installs a new user device 130 on the LV subnet coupled to a bypass device 134, the user device 130 may need to be provisioned to identify itself on the network. To do so in this embodiment, the new user device 130 transmits a DHCP request, which is received and routed by the bypass device 134 to a DHCP server running in the controller 172 of the bypass device 134. In response to the request, the bypass device 134 may respond by transmitting to the user device 130 the IP address and subnet mask for the user device, the gateway IP address for the device's network interface to be used as the network gateway (e.g., the IP address of the LV modem 186 of the bypass device 134), and the IP addresses of the Domain Name Servers (DNS) all of which are stored in memory by the user device 130. In addition, the bypass device 134 may transmit a new user device Alert to the PLS 144.

After provisioning, it may be desirable to register the user device 130 with the network, which may require providing user information (e.g., name, address, phone number, etc.), payment information (e.g., credit card information or power utility account information), and/or other information to the registration server. The registration server may correlate this information with information of the utility company or Internet service provider. The registration server may form part of, or be separate from, the PLS 144. Until registered, the bypass device 134 prevents the user device 130 (through its power line modem 131) from communicating with (receiving data from or transmitting data to) any computer other than the registration server or the two DNS's. Thus, until the user device 130 is registered, the bypass device 134 may filter data packets transmitted to and/or from the user device that are not from or to the registration server or a DNS. In addition, requests (such as HTTP requests) for other Internet web pages may be redirected and transmitted as a request for the registration web page on the registration server, which responds by transmitting the registration web page. Control of access of the user device 130 may be performed by limiting access based on the IP address of the user device to the IP addresses of the registration server and DNS's.

After registration is successfully completed, the registration server communicates with the PLS 144 to provide registration information of the user device 120 to the PLS 144. The PLS 144 transmits an activation message for the user device 130 (or power line modem 131) to the bypass device 134. In response, the bypass device 134 removes communication restrictions and permits the user device 130 (and power line modem 131) to communicate through the PLCS 102 to all parts of the IP network 126. As will be evident to those skilled in the art, filtering of data and controlling access of the user device 130 may be performed by limiting access based on the IP address of the user device 130 (or depending on the network communication protocol, the MAC address of the user device) or the MAC address of the power line modem 131 to which the user device 130 is connected. Thus, the bypass device 134 may compare the source IP address (or MAC address) with information in its memory to determine if the IP address (or MAC address) is an address that has been granted access to the PLCS 102. If the source address is not an address that has been granted access to the PLCS 102 (e.g., by registering, which results in an activation message from the PLS 144 to the bypass device 134), the bypass device 134 may replace the destination IP address of the packet with the IP address of the registration server and transmit the packet to the backhaul point 132. The procedure above, or portions of the procedure, with respect to provisioning user devices 130 may be used to provision a power line modem 131 instead of or in addition to a user device 131.

Accordingly, the power line communication system 102 may provide high speed internet access and streaming audio services to each home, building or other structure, and to each room, office, apartment, or other unit or sub-unit of multi-unit structure using Homeplug®, IEEE 802.11 (Wifi), 802.16, wired Ethernet, or other suitable method.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A system for providing power line communications over a power distribution system including an underground power line and an overhead medium voltage power line and wherein the underground medium voltage power line is connected to the overhead medium voltage power line at a riser pole, comprising:
    a first and second communication device communicatively coupled to the underground power line at different locations;
    wherein said first and second communication devices are disposed within different transformer enclosures;
    a third communication device coupled to the underground power line at the riser pole to communicate with said first communication device via the underground power line;
    a backhaul communication device comprising a backhaul interface for communicating via a non-power line medium and a power line interface communicatively coupled to the overhead medium voltage power line and to communicate with said third communication device;
    wherein said backhaul communication device communicates with said third communication device via a path that includes the overhead medium voltage power line and the underground medium voltage power line; and
    wherein said first communication device is configured to receive communications communicated over the underground medium voltage power line from said third communication device and to transmit said communications over the underground medium voltage power line for reception by said second communication device.

2. The system of claim 1, further comprising a fourth communication device coupled to the underground power line, and wherein said second communication device is configured to receive data via the underground power line from said first communication device and to transmit the received data over the underground power line for reception by said fourth communication device.

3. The system of claim 1, wherein said first communication device comprises a low voltage port for communicating over a low voltage (LV) power line.

4. The system of claim 3, wherein the LV power line includes two energized conductors and said LV port is configured to transmit data signals differentially on the two energized conductors.

5. The system of claim 3, wherein said LV port comprises an inductive coupler.

6. The system of claim 3, wherein the first communication device, comprises a current sensor configured to sense current carried by an energized conductor of said LV power line.

7. The system of claim 6, further comprising a system controller remote from said first communication device and configured to receive data of the sensed current.

8. The system of claim 1, wherein said backhaul interface is configured to communicate wirelessly.

9. The system of claim 1, wherein said second communication device comprises a controller configured to respond to control messages received via the underground power line.

10. The system of claim 9, further comprising a system controller remote from said first and second communication devices; the system controller configured to transmit said control messages to the second communication device controller and to receive data from the second communication device controller.

11. The system of claim 1, wherein the second device is configured to monitor data traffic and to transmit information of the data traffic to a remote computer via the underground power line.

12. The system of claim 1, wherein said first and second communication devices each comprises:
    an underground power line interface configured to communicate over the underground power line and including a first modem; and
    a low voltage power line port configured to communicate over a low voltage power line and including a second modem in communication with said first modem.

13. The system of claim 12, wherein said first and second communication devices each comprises a controller communicatively coupled to said first modem and said second modem.

14. The system of claim 12, wherein said first and second communication devices each comprises:
  a memory;
  a controller communicatively coupled to said memory and said first modem; and
  executable program code stored in said memory.

15. The system of claim 1, wherein said first and second communication devices each comprises a router configured to route data packets.

16. The system of claim 1, wherein said first and second communication devices each comprises:
  a memory;
  a controller communicatively coupled to said memory and said first modem; and
  executable program code stored in said memory.

17. The system of claim 16, wherein said executable program code includes a code segment configured to cause said controller to route data packets.

18. The system of claim 16, wherein said executable program code includes a code segment configured to cause said controller to initiate power quality measurements.

19. The system of claim 16, wherein said executable program code includes a code segment configured to cause said controller to detect a power outage and, upon detection of a power outage, to cause said controller to transmit a power outage notification over the underground power line.

20. The system of claim 19, wherein said executable program code includes a code segment configured to cause said controller to detect a power restoration and, upon detection of said power restoration, to transmit a power restoration notification over the underground power line.

21. The system of claim 1, wherein said second communication device comprises a voltage sensor for measuring a voltage of a power line and is configured to transmit a notification if a measured voltage is beyond a threshold voltage.

22. A system for providing power line communications over a power distribution system including a plurality of distribution transformers coupled to an underground medium voltage power line that connects to an overhead power line at a riser pole, the system comprising:
  a plurality of communication devices communicatively coupled to the underground power line, wherein each of said plurality of communication devices is co-located with a different one of the plurality of distribution transformers;
  each of said plurality of communication devices including:
    an underground power line port configured to communicate over the underground medium voltage power line and including a first modem; and
    a low voltage power line port configured to communicate over a low voltage power line and including a second modem in communication with said first modem;
  wherein each of said plurality of communication devices is disposed within a different transformer enclosure;
  an interface device communicatively coupled to the underground medium voltage power line at a riser pole for communication with at least one of said plurality of communication devices via the underground medium voltage power line, said interface device including a backhaul interface configured to communicate over a non-power line communication medium;
  wherein a multitude of said plurality of communication devices are configured to receive data via the underground medium voltage power line from another of said plurality of communications device and to transmit at least some of said received data on the underground medium voltage power line; and
  wherein said plurality of communication devices are configured to transmit to, and to receive data from, one or more devices communicatively coupled to low voltage power lines.

23. The system of claim 22, wherein said plurality of communication devices each comprises a current sensor configured to sense current carried by the low voltage power line.

24. The system of claim 22, further comprising a system controller remote from said plurality of communication devices and configured to receive data from said plurality of communication devices and to transmit control messages to said plurality of communication devices.

25. The system of claim 22, wherein each of said plurality of communication devices comprises:
  a memory;
  a controller communicatively coupled to said memory and said first modem; and
  executable program code stored in said memory.

26. The system of claim 25, wherein said executable program code includes a code segment configured to cause said controller to initiate power quality measurements.

27. The system of claim 25, wherein said executable program code includes a code segment configured to cause said controller to detect a power outage and, upon detection of a power outage, to cause said controller to transmit a power outage notification over the underground power line.

28. The system of claim 25, wherein said executable program code further includes a code segment configured to cause said controller detect a power restoration and, upon detection of said power restoration, to transmit a power restoration notification over the underground power line.

29. The system of claim 22 wherein each of said plurality of communication devices comprises a router configured to route data packets.

30. The system of claim 22, wherein each of said plurality of communication devices comprises a voltage sensor for measuring a voltage of a power line and is configured to transmit a notification if a measured voltage is beyond a threshold voltage.

* * * * *